United States Patent [19]

Lundberg et al.

[11] Patent Number: 4,526,951
[45] Date of Patent: Jul. 2, 1985

[54] POLYMERIC COMPOSITIONS OF CO- AND TERPOLYMERS

[75] Inventors: Robert D. Lundberg, Bridgewater; Robert A. Weiss, Summit, both of N.J.

[73] Assignee: Exxon Research & Engineering Company, Florham Park, N.J.

[21] Appl. No.: 492,945

[22] Filed: May 9, 1983

Related U.S. Application Data

[63] Continuation of Ser. No. 251,042, Apr. 6, 1981, abandoned, which is a continuation of Ser. No. 117,198, Jan. 31, 1980, abandoned.

[51] Int. Cl.³ .......................................... C08F 228/02
[52] U.S. Cl. .................................. 526/240; 524/394; 524/547; 526/241; 526/287
[58] Field of Search ....................... 526/287, 240, 241

[56] References Cited

U.S. PATENT DOCUMENTS

| | | | |
|---|---|---|---|
| 2,348,705 | 5/1944 | Alderman | 526/287 |
| 3,306,871 | 2/1967 | Miller | 526/287 |
| 3,396,136 | 8/1968 | Dickerson | 526/287 |

Primary Examiner—Christopher A. Henderson
Attorney, Agent, or Firm—Richard E. Nanfeldt

[57] ABSTRACT

The present invention relates to polymeric compositions formed from sulfonated co- or terpolymers which are formed by a free radical co- or terpolymerization process, wherein the resultant co- or terpolymers have an $\overline{M}n$ of about 5,000 to 200,000 and these co- or terpolymers have at least about 0.5 weight percent of chemically combined sulfur therein. The free radical co- or terpolymerization process of the instant invention can be generally described as a free radical emulsion polymerization of at least one conjugated diene or a mixture of styrene and butadiene with a sulfonate monomer which is water soluble, at a temperature sufficient to cause polymerization, wherein the initiator is preferably based on a peroxide initiator accelerated by a reducing agent, and suitable surfactants are employed. Upon completion of the free radical polymerization, the resultant latex is coagulated and the water insoluble polymer is recovered.

6 Claims, No Drawings

POLYMERIC COMPOSITIONS OF CO- AND TERPOLYMERS

CROSSREFERENCE TO RELATED APPLICATIONS

This application is a continuation of Ser. No. 251,042 filed Apr. 6, 1981, now abandoned, which is a continuation of Ser. No. 117,198, filed Jan. 31, 1980, now abandoned.

BACKGROUND OF THE INVENTION

1. Field of the Invention

The formation of compositions of sulfonate containing polymers have been clearly defined in a number of U.S. Pat. Nos.: 3,642,728; 3,836,511; 3,847,854; 3,870,841; and 3,877,530. The compositions of these patents are formed from sulfonate polymers which are formed by contacting a polymer having olefinic unsaturation with a sulfonating agent.

The compositions of this patent differ from the previously identified compositions in the aforementioned patents in that the polymers of the instant compositions are formed by free radical emulsion polymerization of at least one conjugated diene with a sulfonate containing monomer to form a substantially gel-free co- or terpolymer having a major portion of a conjugated diene and a minor portion of a sulfonate containing monomer, wherein the co- or terpolymer is water insoluble.

2. Prior Art

Copolymers and terpolymers containing sulfonate monomers at low levels have been described previously in the art. For example, U.S. Pat. No. 3,306,871 describes the preparation of latices based on several different vinyl monomers. This prior art is particularly relevant to the instant invention because it distinguishes those features which are characteristic of much of the prior art in the area of metal sulfonate ionomers.

It has become clear based on recent work that sulfonate ionomers can manifest many peculiarities which make their characterization extremely difficult. The foremost of these is a strong ionic crosslinking which makes such materials difficult to dissolve in solution or to achieve melt flow.

This particular problem is exacerbated even more when describing copolymers of diene monomers and metal or amine sulfonate containing monomers for in this latter case the probability of a high degree of covalent crosslinking is extremely likely. When concurrent problems of ionic crosslinking and covalent crosslinking are now combined with problems of uniform copolymers obtained between a relatively nonpolar hydrocarbon monomer and a highly polar salt molecule which are normally completely immiscible, and the normal problems of molecular weight control desired of all polymer systems, it becomes evident why there is a paucity of information concerning the characteristics of the isolated sulfonate ionomers obtained by copolymerization of dienes and metal or amine sulfonate containing monomers. In fact, a review of the patent art and the literature suggests that a complete characterization of such systems has not often, if ever, been previously attempted.

Possibly for the above reasons most of the patent art in this area describes the latexes achieved by the presumed reaction of such sulfonate monomers with selected vinyl and diene monomers. That the products are copolymers is presumed by suggestions that the resulting latexes are more stable, more water resistant, and more adherent than those obtained in the absence of the sulfonate monomer.

The instant invention is directed at compositions of a different class of copolymers of dienes and metal or amine sulfonate containing monomers. This invention is concerned with the preparation and resultant compositions of co- or terpolymers of dienes and sulfonate monomers which are of desirable molecular weights, are substantially free of covalent crosslinking (less than 10% of the product appears as a gel in prescribed tests), contain sulfonate levels of from 0.5 weight percent chemically combined sulfur up to 5 weight percent chemically combined sulfur, are water insoluble, and are prepared by a process designed to give products substantially free of homopolymers of any of the polymerizable components, and are solid products, characterizable in terms of reduced viscosity, molecular weight and/or melt flow (at elevated temperatures).

In light of the above distinguishing features it is readily apparent as to why the products and process of the instant invention differ from those of GB Pat. No. 895,033. That patent addresses specifically latexes based on copolymerization of a suitable aromatic vinyl sulfonic acid derivative with a variety of different polymerizable monomers. It is important to note that all aspects of that invention are solely concerned with the resultant latexes, that the products are isolated entities.

For the purposes of the instant invention many of the features of the products in GB No. 895,033 are undesirable. For example, it is emphasized in that application that improved latex stability is an asset, for the purpose of the instant invention that improved latex stability can be a debit in that difficulties may be encountered in isolating the solid polymer.

Another feature of the instant invention is that the instant disclosure is directed towards products which are demonstrated to be substantially free of covalent crosslinking and techniques whereby the ionic crosslinking desired in such systems can be separated from the covalent crosslinking. This demonstration has not been illustrated in the prior art to copolymers of sulfonate containing monomers with polymerizable conjugated diolefins. Without this illustration it would be difficult if not impossible to employ the resultant products in some of their intended applications.

Finally, and most importantly, U.S. Pat. No. 3,306,871 and GB No. 895,033 specifically state in column 1, second paragraph of both patents that those inventions were concerned with polymer latexes wherein the sulfonic acid salt is incorporated as an anionic stabilizer. It is important to emphasize that in the instant invention the sulfonate is incorporated at specific levels to function as an ionic crosslinking agent. By that we mean that in these systems the neutralized sulfonate provides a salt species which interacts with other salt species to provide a strong ionic crosslink. This characteristic is observed and desired, not in the latex form, but is extremely important in determining the bulk physical properties, especially in the compositions to be described herein.

In light of the above discussions it is apparent that the products of this invention differ markedly from those of the prior art in properties, in composition and in their specific structural features.

In addition, the catalysts or initiators employed, for example. in GB No. 895,033 differ from those employed in the process of the instant invention. The prior art has suggested that either water soluble free radical-generating catalysts or oil soluble free-radical generating catalysts are suitable. Alternatively, U.S. Pat. No. 2,913,429 specifies that "it is necessary that the polymerization mixture include a water soluble peroxy compound as a catalyst and it is desirable, but not essential, that it also include an oil soluble catalyst ingredient" (column 2, line 28 forward).

The initiators of the instant invention are important and different from those of the prior art for it is believed that they function to give an optimum copolymerization without significant incorporation of either a homopolymer of the hydrocarbon molecule or a homopolymer of the metal sulfonate monomer. If one employs substantial levels of an oil-soluble initiator which can spontaneously polymerize solely in the diene phase then that species can be polymerized without a corresponding incorporation of the sulfonate species. By appropriate selection of one catalyst component soluble in the polymerizable hydrocarbon phase and a second catalyst component (reducing agent) in the aqueous phase then the interaction of these components can result in a more uniform copolymerization predominantly at the interface.

Another patent which can be considered to be relevant to the instant invention and which teaches ionic crosslinking is that of Rees, U.S. Pat. No. 3,322,734. U.S. Pat. No. 3,322,734 teaches that ionically crosslinked copolymers may be prepared via direct copolymerization and teaches how such ionic crosslinking can change the properties of polymers. However, that patent specifically is directed at neutralization levels of between 10% and 90% of the acid species present. The instant invention is directed at neutralization levels of 95% and above, and preferably at ionomers which are 100% neutralized. The properties of the resulting material which are 100% neutralized are substantially different from those which are only 50% or 90% neutralized. Therefore, the instant invention is substantially different from that of U.S. Pat. No. 3,322,734.

In addition to the above art, mention should be made of U.S. Pat. No. 2,913,429 which is concerned with synthetic latexes designed to form films which are based on aqueous dispersions of copolymers of one or more aliphatic conjugated diolefins with at least two monovinyl aromatic compounds including a monovinyl aromatic sulfonate etc. This invention differs from that prior art in the following:

(1) This application is not concerned with films from latexes.
(2) That invention contains from 4 to 35, preferably from 5 to 15 weight percent sulfur monomer and thereby provides coatings or films which can readily be removed from substrates by washing or scrubbing with water. Obviously, these systems are designed to be water sensitive and thereby removable, the compositions of the instant invention are designed to be water insensitive.
(3) That cited patent required 93 to 25, preferably from 77 to 45% vinyl aromatic compound such as styrene. The instant application does not permit more than 48% styrene, preferably from about 20 to about 40 weight percent.
(4) That invention requires a water soluble peroxy compound as initiator whereas this application required a hydrocarbon soluble peroxy initiator and a water soluble reducing agent.

There are many other distinctions but it is obvious that the above invention is directed at essentially rigid removable paint films, wherein the sulfonate groups provide adequate water sensitivity to permit the formation of a stable latex which further can be deposited as a removable film. Nowhere in that invention is the concept of a metal sulfonate copolymer possessing strong ionic crosslinks in the bulk product taught, inferred, or even desired.

The use of metal stearate and similar derivatives as plasticizers for metal sulfonated polymers has been described in previous and issued U.S. Pat. Nos. 3,642,728 and 3,870,841. Consequences of plasticization of such polymers with metal stearates are improved flow at elevated temperatures and improved tensile properties at ambient temperature. While the mechanism for these improvements is not completely clear, it is apparent that major improvements of the physical property-rheology balance of metal sulfonate elastomers and plastics are feasible by this approach.

It should be emphasized that the prior art relating to these plasticization concepts has been based on the sulfonation of preformed polymers, followed by neutralization. The instant invention is concerned with the plasticization of copolymers of sulfonate monomers with selected diene monomer or terpolymers which may involve a third monomer such as styrene. It is important to recognize some major distinctions of these materials as compared to those of the prior art. The most important one is that prior to this invention there is no evidence that plasticization of sulfonate copolymers was ever attempted. Secondly, the plasticization of these polymers appears markedly different in concept and in practice from the plasticization attempts of other types of sulfonated polymers. The sulfonate copolymers employed in this invention have modest sulfonate levels of about 5 to about 300 meq. per 100 gms of polymer with the major portion of the polymer molecule being based on the diene. Consequently, these products have a very high level of unsaturation, and therefore, have different requirements for plasticization than do sulfonated polymers. For example, when exposed to processing temperatures of 300° to 400° F., the polymers of the instant invention can crosslink extremely readily. This characteristic thus sets such systems apart from the sulfonated ethylene propylene terpolymers (EPDM) previously described.

The molecular weights and molecular weight distribution of the sulfonate copolymers are also quite different from those characteristics of the sulfonate polymers. This difference has an important effect on the properties and flow behavior of the products. In addition, properties such as low temperature glass transition or brittleness temperature are different for the products of this invention from those previously described.

Finally, due to the way in which these products are created the sulfonate level can be much higher (or even lower) than those products obtained by sulfonation of a preformed polymer. For example, the sulfonation of EPDM requires a certain level of unsaturation to effect the necessary sulfonate level. Practically this provides an upper limit of sulfonation to about 40 to 60 meq. of sulfonate per 100 gms of polymer. The sulfonate copolymers employed in this invention can be substantially higher in sulfonate content which makes the plasticization requirements more critical.

SUMMARY OF THE INVENTION

The present invention relates to polymeric compositions formed from sulfonated co- or terpolymers which are formed by a free radical co- or terpolymerization process, wherein the resultant co- or terpolymers have an $\overline{M}_n$ of about 5,000 to 200,000 and these co- or terpolymers have at least about 0.5 weight percent of chemically combined sulfur therein. The free radical co- or terpolymerization process of the instant invention can be generally described as a free radical emulsion polymerization of at least one conjugated diene or a mixture of styrene and butadiene with a sulfonate monomer which is water soluble, at a temperature sufficient to cause polymerization, wherein the initiator is preferably based on a peroxide initiator accelerated by a reducing agent, and suitable surfactants are employed. Upon completion of the free radical polymerization, the resultant latex is coagulated and the water insoluble polymer is recovered.

The instant polymeric compositions of the sulfonated co- or terpolymers comprise a homogenous blend of the sulfonated co- or terpolymers and at least one additive selected from the group consisting of inorganic fillers, non-polar process oil, and preferential plasticizers and mixtures thereof. The resultant polymeric compositions are formed by suitable plastic molding processes into elastomeric articles such as a garden hose and unit sales for footwear applications. The resultant elastomeric article has excellent low temperature flexibility, good resilience, and a rubber-like feel.

GENERAL DESCRIPTION OF THE INVENTION

The solid elastomeric co- or terpolymer of the instant invention comprise at least 80% by weight of at least one conjugated diene having from 4 to 12 carbon atoms and a minor proportion of a metal or amine neutralized sulfonate monomer characterized by the formula:

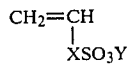

wherein X is aromatic or $(CH_2)_n$, wherein $n=0, 1, 2, 3, 4$ and Y is a cation selected from Groups IA, IIA, IB and IIB of the Periodic Table or an amine of the formula:

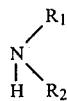

where $R_1$ and $R_2$ can be aliphatic groups of $C_1$ to $C_{12}$ or hydrogen, the co- or terpolymer being water insoluble having at least 0.5 weight percent sulfur to less than about 5 weight percent sulfur chemically combined.

The terpolymers of the instant invention can also comprise a terpolymer of styrene, butadiene and a sulfonate containing monomer characterized by the formula:

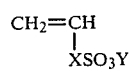

where X is aromatic $(CH_2)_n$, or wherein $n=0, 1, 2, 3, 4$ and Y is a cation selected from Groups IA, IIA, IB and IIB of the Periodic Table or an amine of the formula:

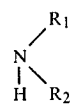

where $R_1$ and $R_2$ can be aliphatic groups of $C_1$ to $C_{12}$ or hygen, the terpolymer being water insoluble and having at least 0.5 weight percent sulfur to less than about 5 weight percent sulfur chemically combined.

The formed terpolymers styrene/butadiene and sulfonate monomer contain about 13 to about 48 wt. % styrene, more preferably about 20 to about 40 wt. %, and most preferably about 25 to about 35 wt. %; about 45 to about 88 wt. % of butadiene, more preferably about 55 to about 80 wt. % and most preferably about 65 to about 75 wt. %. The amount of sulfonate monomer contained in these terpolymers is defined in terms of weight percent chemically combined sulfur. The terpolymers of the instant invention contain about 0.5 to about 5 weight % of chemically combined sulfur, more preferably about 0.6 to about 3 and most preferably about 0.7 to 2.0 weight percent sulfur. A minor proportion of the sulfonate monomer is heretofore defined as a termonomer (the sulfonate-containing species) concentration corresponding to 0.5 to 5 weight percent chemically combined sulfur.

The instant invention relates to the formation of sulfonate containing co- or terpolymers which are formed by a free radical co- or terpolymerization process. The monomers used in the free radical emulsion copolymerization process are conjugated dienes or a mixture of styrene and butadiene which are co- or terpolymerized with sulfonate containing monomers.

In general, the conjugated diene or mixture of styrene and butadiene and sulfonate containing monomer are dispersed in a water phase in the presence of an initiator which is preferably soluble in the hydrocarbon phase, a water soluble reducing agent, and a suitable surfactant, wherein the temperature is sufficient to initiate polymerization. The resultant latex is coagulated usually by the addition of an aqueous salt solution and the recovered co- or terpolymer is washed with water and subsequently dried under vacuum at room temperature. Alternatively, the latex can be coagulated by the addition of methanol.

The co- or terpolymers formed from the free radical emulsion co- or terpolymerization process of the instant invention can be generally described as having an $\overline{M}_n$ of about 5,000 to about 200,000, more preferably about 10,000 to about 100,000. The co- or terpolymers of the instant invention contain about 0.5 to about 5 weight percent of chemically combined sulfur, more preferably to about 0.6 to about 3, most preferably about 0.7 to about 2.0 weight percent sulfur. Typical, but non-limiting examples of the copolymers which can be formed by the instant free radical emulsion co- or terpolymerization process are: butadiene/styrene, sodium styrene sulfonate co- or terpolymer, butadiene/sodium styrene sulfonate copolymer, isoprene/sodium styrene sulfonate copolymer, butadiene/sodium vinyl sulfonate copolymer, isoprene/sodium vinyl sulfonate copolymer. Obviously an infinite number of copolymers and even terpolymers can be formed by the instant free radical co- or terpolymerization process. Typically, the copolymerization of any conjugated diene as so defined herein can be readily copolymerized with any sulfonate containing monomer as is defined herein. Terpolymers with acrylonitrile or vinyl chloride as the termonomers with the aforementioned dienes are also contemplated.

CONJUGATED DIENES

The conjugated dienes of the instant invention are generally defined as aromatic such as acyclic conjugated dienes containing from about 4 to about 10 carbon atoms, more preferably about 4 to 6 carbon atoms. Typical, but nonlimiting examples of acyclic conjugated dienes are piperidene, 1,3-butadiene, isoprene (2-methyl-1,3-butadiene), 2,3-dimethyl, 1,3-butadiene, 1,3-pentadiene, 2-methyl-1,3-pentadiene, 2,3-dimethyl-1,3-pentadiene, 3-methyl-1,3-pentadiene, 2,3-dimethyl-1,3-pentadiene, 3-methyl-1,3-pentadiene, 2-phenyl butadiene, chloroprene and piperidene. Typical but nonlimiting examples of cyclic conjugated dienes are cyclopentadiene and methyl cyclopentadiene. The preferred conjugated dienes of the instant invention are selected from the group consisting of 1,3-butadiene, isoprene, chloroprene. In the formation of the sulfonate containing co- or terpolymer, one co- or terpolymerizes one of the aforementioned conjugated dienes with the sulfonate containing monomer. Sulfonate containing terpolymers can be readily formed by copolymerizing the sulfonate containing monomer with a mixture of two of the above identified conjugated dienes or with a mixture of styrene and a conjugated diene such as butadiene. A particularly preferred combination of comonomers in forming a sulfonated terpolymer is a mixture of styrene and butadiene. The formed terpolymers contain: about 13 to about 48 wt. % styrene, more preferably about 20 to about 40 wt. %, and most preferably about 25 to about 35 wt. %; about 45 to about 88 wt. % of butadiene, more preferably about 55 to about 80 wt. % and most preferably about 65 to about 75 wt. %; and a minor proportion of the sulfonate containing monomer corresponding to from about 0.5 to about 5 percent chemically combined sulfonates. A preferred sulfonated polymer to be used in forming the terpolymer with the styrene and butadiene is sodium styrene sulfonate. The molar ratio of the sulfonate containing monomer to the mixture of styrene and butadiene is about 1/200 to about 1/5, more preferably about 1/150 to about 1/6, and most preferably about 1/100 to about 1/9.

SULFONATE CONTAINING MONOMERS

The sulfonate containing monomers of the instant invention which are water soluble can be generally described as a monomer having unsaturation and a metal or amine sulfonate group. The metal or amine neutralized sulfonate monomer is characterized by the formula:

$$CH_2=CH$$
$$|$$
$$XSO_3Y$$

where X is aromatic $(CH_2)_n$, where $n=0, 1, 2, 3, 4$ and Y is a cation selected from Groups IA., IIA, IB and IIB of the Periodic Table of an amine of the formula:

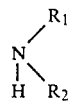

where $R_1$ and $R_2$ can be aliphatic groups of $C_1$ to $C_{12}$ or hydrogen. Particularly suitable metal cations are sodium, potassium, and zinc, and an especially preferred metal cation is sodium. Typical, but non-limiting examples of suitable sulfonate containing monomers are:

$CH_2=CHSO_3^-Na^+$ sodium vinyl sulfonate (1)

$CH_2=CHCH_2SO_3^-Na^+$ sodium allyl sulfonate (2)

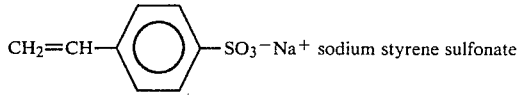 (3)

sodium styrene sulfonate

An especially preferred sulfonate containing monomer is metal styrene sulfonate. The molar ratio of sulfonate containing monomer to conjugated diene is about 1/200 to about 1/5, more preferably about 1/150 to about 1/6 and most preferably about 1/100 to about 1/9.

The redox emulsion polymerization recipe used in this invention is effective in initiating the copolymerization of water-insoluble and water-soluble comonomers in an emulsion system. Because the peroxide initiator is dissolved in the hydrocarbon monomer and the redox activator is dissolved in the water, the surface of the micelle/growing polymer particle is believed to be the locus of formation of initiator molecules as well as the polymerization locus. Water phase homopolymerization of the polar, water soluble monomer is effectively depressed because of low primary radical concentration in the aqueous phase.

Similarly, the activity of the free radical catalyst in the hydrocarbon monomer phase is substantially less than in the vicinity of the reducing agent. As a result the polymerization of homopolymers is believed to be effectively depressed.

Reducing agents suitable for this invention are those known in the art with the additional requirement that they be soluble in water. A preferred reducing agent is triethylene tetraamine.

A variety of free radical catalysts can be employed in this invention with the requirement that they are substantially soluble in the diene monomer phase. This includes a preferential class of free radical initiators such as benzoyl peroxide, cumene peroxide, diisopropylbenzene hydroperoxide, t-butyl hydroperoxide and similar systems which will be preferentially soluble in the monomer phase as opposed to the aqueous phase. There are a large number of such peroxides used in the art and those having the appropriate solubility behavior and suitable decomposition temperatures in the presence of the reducing agents are satisfactory for the purposes of this invention.

The surfactants employed for this invention are varied and well known in the art. The typical emulsifiers or surfactants can be employed, however, some are more effective than others in generating latexes of better stability. A preferred emulsifier is sodium lauryl sulfate.

The buffering agents employed in the instant polymerization process are selected from the group consisting of sodium carbonate, ammonia, sodium acetate, trisodium phosphate etc. These buffering agents are empolyed at a concentration of about 0.1 to about 5 grams/100 grams water employed in the emulsion system.

Chain transfer agents can be readily employed in the instant polymerization process for controlling the molecular weight of the resultant copolymer. The concentration of chain transfer agent is about 0.05 to about 0.75 grams/100 grams of the combined weight of the sulfonate containing monomer and the conjugated diene.

The free radical emulsion co- or terpolymerization of the water soluble sulfonate containing polymer and at least one conjugated diene or a mixture of styrene and conjugated diene yields a stable latex, wherein the resultant water insoluble co- or terpolymer is not covalently crosslinked and possesses substantial ionic crosslinking, and has about 0.5 to about 5 weight percent of chemically combined sulfur, more preferably about 0.6 to about 3. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble co- or terpolymer is recovered by filtration and subsequently washed with water and dried under vacuum conditions. Alternatively, the polymer can be coagulated by precipitation with alcohol such as methanol.

A preferential plasticizer can be incorporated into the neutralized sulfonated elastomeric co- or terpolymer at less than about 80 parts by weight per 100 parts of the sulfonated co- or terpolymer, more preferably at about 5 to about 60, and most preferably at about 8 to about 30. The preferential plasticizers are selected from the group consisting of fatty acids having about 8 to about 30 carbon atoms and metallic salts of the fatty acids and mixtures thereof, wherein the metal ion of the metallic salt of the fatty acid is selected from the group consisting of antimony, iron, aluminum, lead and Groups IA, IIA, IB and IIB of the Periodic Table of Elements. Alternatively, other preferential plasticizers are selected from organic esters, phenols, trialkyl phosphates, alcohols, amines, amides, ammonium and amine salts of carboxylic acids and mixtures thereof. The preferred plasticizers are selected from fatty acid or metallic salts of fatty acid and mixtures thereof. Especially preferred plasticizers are zinc stearate or calcium stearate. The resultant neutralized sulfonated elastomeric polymer with preferential plasticizer is isolated from the solution by conventional steam stripping and filtration.

The neutralized sulfonated elastomeric polymer is blended with a filler and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. A suitable polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The fillers employed in the present invention are selected from talcs, ground calcium carbonate, water precipitated calcium carbonate, or delaminated, calcined or hydrated clays and mixtures thereof. These fillers are incorporated into the blend composition at about 25 to about 300 parts by weight per 100 parts of the sulfonated co- or terpolymer, more preferably at about 25 to about 250 and most preferably at about 25 to about 200. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil XB | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Talc magnesium silicate | Mistron Vapor | 60–70 | 2.75 | 2 | 9.0–7.5 |

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 20 to about 200 parts by weight per 100 parts of the sulfonated co- or terpolymer, more preferably at about 20 to about 175, and most preferably at about 25 to about 150.

TABLE II

| Type Oil | Oil Code # | Viscosity ssu | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |

TABLE II-continued

| Type Oil | Oil Code # | Viscosity ssu | Mn | % Polars | % Aromatic | % Saturates |
|---|---|---|---|---|---|---|
| Aromatic | Flexon 340 | 120 | — | 1.3 | 70.3 | 28.4 |
| Naphthenic | Flexon 765 | 505 | — | 0.9 | 20.8 | 78.3 |

The filler to oil ratio in the present instant application is critical and should be about 0.2 to about 2, more preferably 0.5 to about 1.75 and most preferably about 0.75 to about 1.25.

Various other additives can be incorporated into the blend compositions to improve the physical properties, the appearance, the chemical properties of the formed elastomeric article or to modify the processability of the blend compositions.

Additionally, reinforcing fillers can be added as additives to the blends of sulfonated polymer, filler and oil, wherein the reinforcing filler is selected from the group consisting of silica, carbon black, and calcium silicate and mixtures therein. These reinforcing agents are generally characterized as having particle sizes below 0.1 microns and oil absorption above about 100. These reinforcing fillers are incorporated in the blend composition at less than about 50 parts by weight based on 100 parts of sulfonated polymer, more preferably 1 to 25.

DETAILED DESCRIPTION OF THE PREFERRED EMBODIMENTS

As exemplified in the following illustrative examples a series of copolymers were prepared.

EXAMPLE 1

Reaction Formulations

| Reactant | Copolymer A | Copolymer B |
|---|---|---|
| Butadiene (g) | 116 | 77.3 |
| Sodium Styrene Sulfonate (g) | 18 | 8 |
| Boiled, Distilled Water (g) | 200 | 200 |
| Diisopropylbenzene Hydroperoxide (g) | 2 | 2 |
| Triethylenetetramine (g) | 2 | 2 |
| Tween 80 (g) | 14 | 9.2 |
| $Na_4P_2O_7.10H_2O$ (g) | 1.2 | 1.2 |
| 1-Dodecanethiol (g) | 0.84 | 0.56 |

Free radical emulsion polymerizations were carried out at ~ 20° C. in 1-quart beverage bottles sealed with screw caps. The reaction emulsion was agitated by means of a mechanical shaker. At the end of the reaction (22.5 hours for A and 20 hours for B) the latex was coagulated by the addition of methanol, and the copolymers were washed with methanol and water and dried under vacuum at room temperature. The products are described in Table III.

Films of these copolymers were cast from solution onto teflon and were first air dried and subsequently vacuum dried at room temperature. Microtensile specimens were cut and tested with an Instron Testing Machine. The mechanical properties of these copolymers are given in Table III.

TABLE III

| Copolymer | % Sulfur | Mole % NaSS | n red (dl/g) | Modulus at 100%, Elongation (psi) | Ultimate Strength (psi) | Ultimate Elongation (%) |
|---|---|---|---|---|---|---|
| 1-A | 0.66 | 1.05 | 1.72 | 83 | 252 | 340 |
| 1-B | 0.46 | 0.79 | 1.66 | 51 | 148 | 810 |

EXAMPLE 2

Compounds of a plasticizer, stabilizers, filler and oil with two butadiene-sodium styrene sulfonate (NaSS) copolymers from Example I, were prepared on a laboratory micro-mill at 80°–90° C. The compound formulations are given in Table IV.

The compounding procedure was as follows. The copolymer was placed on the moving rolls of a micro-mill preheated to 80°–90° C. The neat polymer would not band, indicating the presence of strong ionic associations, or physical crosslinks. A premixed blend of a plasticizer (zinc stearate) and stabilizers (antioxidant 2246 and dilauryl thiodipropionate (DLTDP)) was added to the polymer. The plasticizer allowed the polymer to be banded. After achieving a fair band of polymer, the filler (calcium carbonate) and oil (Sunpar 2280) were added, and milling was continued until the mixing was completed. Tensile samples were compression molded at 350° F. and the mechanical properties were determined with an Instron Universal Testing Instrument. The tensile characteristics of these compounds are given in Table V.

TABLE IV

| | II-A | II-B |
|---|---|---|
| Copolymer 1-A | 100 parts by weight | — |
| Copolymer 1-B | — | 100 parts by weight |
| Zinc Stearate | 20 | 20 |
| Antioxidant 2246 | 1.0 | 1.0 |
| Dilauryl Thiodipropionate | 0.5 | 0.5 |
| Purecal U (calcium carbonate) | 50 | 50 |
| Sunpar 2280 (oil) | 25 | 25 |

TABLE V

| Compound | Modulus @ 100% Elongation (psi) | Ultimate Strength (psi) | Ultimate Elongation (%) |
|---|---|---|---|
| II-A | 108 | 190 | 580 |
| II-B | 57 | 148 | 1200 |

EXAMPLE 3

Reaction Formulations 103.5 g butadiene
21.3 g NaSS
266 g water
2.7 g diisopropyl benzene hydroperoxide
2.7 g triethylenetetramine
12.3 g Pluronic F-68
1.6 g $Na_4P_2O_7.10H_2O$
0.74g 1-dodecanethiol The free radical emulsion polymerization was carried out as described in Example 1, The reaction was carried out for 13.5 hours to a conversion of 93%. The copolymer product contained 0.94% chemically combined sulfur (29 milliequivalents NaSS per 100 grams rubber), had a reduced viscosity in 95% toluene and 5% methanol of 1.10 dl/g, and was completely gel-free.

EXAMPLE 4

Compounds of a plasticizer, stabilizers, filler, and oil with the butadiene-sodium sytrene sulfonate copolymer from Example 3 were prepared on a 3×7 inch mill at 80° C. by the procedure described in Example 2. The compound formulations are described in Table VI and the properties in Table VII.

TABLE VI

| Compound | Parts By Weight Copolymer | Parts By Weight ZnSt$_2$ | Parts by wt. Purecal U (calcium carbonate) | Parts By Weight Oil (Sunpar 2280) |
|---|---|---|---|---|
| IV-A | 100 | 20 | 0 | 0 |
| IV-B | 100 | 20 | 50 | 25 |
| IV-C | 100 | 20 | 76 | 43 |
| IV-D | 100 | 20 | 142 | 71 |
| IV-E | 100 | 20 | 254 | 127 |

TABLE VII

| Compound | Melt Index @ 160° C. 250 psi (dg/min) | Modulus @ 100% Elongation (psi) | Ultimate Strength (psi) | Ultimate Elongation % | % Set |
|---|---|---|---|---|---|
| IV-A | 0.313 | 73 | 151 | 750 | |
| IV-B | 0.438 | 64 | 150 | 1010 | 69 |
| IV-C | 0.510 | 61 | 111 | 780 | 63 |
| IV-D | 1.456 | 51 | 88 | 850 | 88 |
| IV-E | 2.759 | 41 | 62 | 600 | 75 |

EXAMPLE 5

Reaction Formulation 29.0 g butadiene
3.0 g NaSS
50 g boiled, distilled water
0.5 g diisopropylbenzene hydroperoxide
0.5 g triethylene tetramine
2.3 g Tween 80
0.3 g Na$_4$P$_2$O$_7$.10H$_2$O
0.14 g 1-dodecanethiol The free-radical emulsion polymerizations were carried out as described in Example 1, except that 10-ounce beverage bottles were used. Sample A was reacted for 6 hours to 29% conversion and Sample B was reacted for 22 hours to 67% conversion. The copolymers are described in Table VIII.

Plasticized compositions were prepared by adding 10 weight percent zinc stearate, based on the weight of the polymer to 2% solution of the copolymers in solution. Films of both plasticized and unplasticized copolymers were cast from solution onto teflon and were first air dried and subsequently vacuum dried at room temperature. Microtensile specimens were cut from these films and mechanical properties were measured with an Instron Testing Machine.

The effect of the addition of zinc stearate on the tensile properties of several butadiene-sodium styrene sulfonate copolymers is illustrated in Table VIII. The effect of zinc stearate on the low molecular weight material is insignificant, while for the higher molecular weight polymer, the net effect is to double the tensile strength.

TABLE VIII

| | | | | Tensile Properties | | | | |
|---|---|---|---|---|---|---|---|---|
| | | | | Without ZnSt$_2$ | | | With 10% ZnSt$_2$ | |
| Sample | % S | Mole % NaSS | $(\eta_{red})_{c=0.2}$ | $E_{100}$ (psi) | $\sigma_u$ (psi) | $\epsilon_u$ (%) | $E_{100}$ (psi) | $\sigma$ (psi) | $\epsilon$ (%) |
| IV-A | 0.70 | 1.2 | 0.478 | 18 | 28 | 430 | 19 | 24 | 300 |
| IV-B | 0.46 | 0.8 | 1.905 | 43 | 290 | >2000 | 56 | 573 | >3000 |

$E_{100}$ = modulus at 100% elongation
$\sigma_u$ = ultimate strength
$\epsilon_u$ = ultimate elongation

EXAMPLE 6

Reaction Formulations

| | A | B | C | D |
|---|---|---|---|---|
| Butadiene (g) | 29 | 19.3 | 29 | 29 |
| NaSS (g) | 3 | 2.0 | 4.5 | 3 |
| Boiled, distilled water (g) | 50 | 50 | 50 | 50 |
| Diisopropylbenzene hydroperoxide (g) | 0.5 | 0.3 | 0.5 | 0.5 |
| Triethylenetetramine (g) | 0.5 | 0.3 | 0.5 | 0.5 |
| Tween 80 | 3.5 | 1.5 | 3.5 | 2.3 |
| Na$_4$P$_2$O$_7$.10H$_2$O (g) | 0.3 | 0.3 | 0.3 | 0.3 |
| 1-dodecanethiol (g) | 0.14 | 0.10 | 0.21 | 0.14 |

The free-radical emulsion polymerizations were carried out for 20 hours as described in Example 5 to conversions of A=77%; B=49%; C=81%; and D=63%. The sulfur concentrations of the copolymers were A=0.47%; B=0.43%; C=0.69%; and D—0.51%.

These copolymers were compounded with 10 weight percent zinc stearate according to the procedure of Example 5. As seen in Table IX, the addition of zinc stearate plasticizer in general, improves the polymer tensile strength and the ultimate elongation.

TABLE IX

| | Tensile Properties | | | |
|---|---|---|---|---|
| | Without ZnSt$_2$ | | With 10% ZnSt$_2$ | |
| Sample | Strength (psi) | Elongation (%) | Strength (psi) | Elongation (%) |
| VI-A | 133 | 520 | 170 | 600 |
| VI-B | 339 | >1500 | 225 | 650 |
| VI-C | 107 | 500 | 321 | 600 |
| VI-D | 100 | 300 | 274 | 520 |

EXAMPLE 7

Zinc stearate was added according to the procedure of Example 3 (10% by weight) to the butadiene-sodium styrene sulfonate copolymer described in Example 1, Sample A, and its effect on the tensile properties of the copolymer is shown in Table X.

Tensile specimens were prepared by casting films from solutions and die-cutting micro-specimens from these films. In general, the tensile strength of the copolymer is improved by the addition of zinc stearate plasticizer.

TABLE X

| % ZnSt$_2$ | Modulus at 100% Elongation (psi) | Ultimate Strength (psi) | Ultimate Elongation (%) |
|---|---|---|---|
| 0 | 43 | 236 | 180 |
| 10 | 57 | 308 | 1700 |

EXAMPLE 8

The effect of the addition of zinc stearate on the melt flow and the tensile properties of the butadiene-sodium styrene sulfonate copolymer described in Example 3 is demonstrated in Tables XI and XII.

In general, the addition of zinc stearate improves the melt flow and enhances the tensile properties.

TABLE XI

| % ZnSt$_2$ | Melt Index @ 160° C. 476 psi (dg/min.) |
|---|---|
| 0 | 0.190 |
| 10 | 0.530 |
| 20 | 0.862 |

TABLE XII

| % ZnSt$_2$ | Modulus at 100% Elongation (psi) | Ultimate Strength (psi) | Ultimate Elongation (%) |
|---|---|---|---|
| 0 | 63 | 119 | 320 |
| 10 | 58 | 167 | 810 |
| 20 | 83 | 151 | 750 |

What is claimed is:

1. A solid, elastomeric, substantially gel free (stable) co- or terpolymer comprising at least 80% by weight of or a mixture of styrene and said conjugated diene and a minor proportion of a metal or amine neutralized sulfonate monomer characterized by the formula:

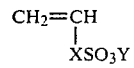

where X is aromatic and Y is a cation selected from Groups IA, IIA, IB and IIB of the Periodic Table or an amine of the formula:

where $R_1$ and $R_2$ can be aliphatic groups of $C_1$ to $C_{12}$ or hydrogen said co- or terpolymer being water insoluble, substantially gel-free, thermally stable and having at least 0.7 weight percent sulfur with a reduced viscosity as measured in a solvent at a concentration of 10 gm/liter of greater than 0.2 to less than 5.0 said co -or terpolymer not being able to form a latex in an aqueous solution.

2. A composition according to claim 1, wherein said sulfonate containing monomer is a metal neutralized sulfonated styrene.

3. A composition according to claims 1 or 2 wherein said conjugated diene is selected from the group consisting of 1,3-butadiene, isoprene and chloroprene and mixtures thereof.

4. A composition according to claim 1 wherein said conjugated diene is 1,3-butadiene.

5. A composition according to claim 1, wherein said sulfonated co- or terpolymer contains at least 0.7 weight percent to less than about 3.0 weight percent sulfur chemically combined.

6. A composition according to claim 1, wherein said sulfonate co- or terpolymer contains at least 0.7 weight percent to less than about 2.0 weight percent chemically combined sulfur.

* * * * *